US012729607B2

(12) United States Patent
Janjuhah et al.

(10) Patent No.: US 12,729,607 B2
(45) Date of Patent: Sep. 8, 2026

(54) CEMENT SYSTEM FOR $CO_2$ INJECTION AND SEQUESTRATION IN MAFIC/ULTRAMAFIC ROCK AND METHOD OF USE

(71) Applicant: PROTOSTAR GROUP LTD., London (GB)

(72) Inventors: Hammad Tariq Janjuhah, Haripur (PK); Amin Amin, Tehran (IR); Juerg Matter, Winchester (GB)

(73) Assignee: PROTOSTAR GROUP LTD., London (GB)

( * ) Notice: Subject to any disclaimer, the term of this patent is extended or adjusted under 35 U.S.C. 154(b) by 0 days.

(21) Appl. No.: 19/197,226

(22) Filed: May 2, 2025

(65) Prior Publication Data

US 2025/0341151 A1 Nov. 6, 2025

Related U.S. Application Data

(60) Provisional application No. 63/641,699, filed on May 2, 2024.

(51) Int. Cl.
*E21B 41/00* (2006.01)
*C04B 18/08* (2006.01)
(Continued)

(52) U.S. Cl.
CPC .......... *E21B 41/0064* (2013.01); *C04B 18/08* (2013.01); *C04B 18/146* (2013.01);
(Continued)

(58) Field of Classification Search
CPC .. E21B 41/0064; E21B 43/261; E21B 33/146; E21B 43/164; C04B 18/08;
(Continued)

(56) References Cited

U.S. PATENT DOCUMENTS 5,252,636 A * 10/1993 Ellenberger ........ C04B 40/0042 523/401
2005/0194190 A1 9/2005 Becker et al.
(Continued)

FOREIGN PATENT DOCUMENTS

CN 113716902 A 11/2021

OTHER PUBLICATIONS

Jianjian Song, et al., "Study on an Epoxy Resin System Used to Improve the Elasticity of Oil-Well Cement-Based Composites", Materials 2022, vol. 15, 5258, Jul. 29, 2022, 12 pages.

*Primary Examiner* — Crystal J Lee
(74) *Attorney, Agent, or Firm* — Oblon, McClelland, Maier & Neustadt, L.L.P.

(57) ABSTRACT

An injection well bored in a mafic and/or ultramafic rock used for carbon dioxide sequestration and a method of cementing a $CO_2$ injection well are described. The injection well may include a surface casing and an injection casing placed in a drilled borehole. The injection well may have an open interval permitting fluid communication f into the mafic and/or ultramafic rock. A cured cement may be present between the mafic and/or ultramafic rock and the injection casing and may be formed from a cementitious slurry mixture containing a class G cement, fly ash, microsilica, additives, and an epoxy resin blend. An injection tubing is disposed in the interior of the injection casing, having fluid communication with the interior of the injection casing. A packer connected to the injection tubing may be present as a fluid seal within the injection casing.

10 Claims, 3 Drawing Sheets

(51) Int. Cl.
*C04B 18/14* (2006.01)
*C04B 24/02* (2006.01)
*C04B 28/04* (2006.01)
*C04B 40/02* (2006.01)
*E21B 33/14* (2006.01)
*E21B 43/16* (2006.01)
*E21B 43/26* (2006.01)

(52) U.S. Cl.
CPC ............ *C04B 24/023* (2013.01); *C04B 28/04* (2013.01); *C04B 40/0277* (2013.01); *E21B 43/261* (2013.01); *E21B 33/146* (2013.01); *E21B 43/164* (2013.01)

(58) Field of Classification Search
CPC ..... C04B 18/146; C04B 24/023; C04B 28/04; C04B 40/0277
See application file for complete search history.

(56) References Cited

U.S. PATENT DOCUMENTS

| | | | | |
|---|---|---|---|---|
| 2016/0168443 | A1 | 6/2016 | Lafitte et al. | |
| 2017/0369761 | A1 | 12/2017 | Jones et al. | |
| 2020/0071593 | A1* | 3/2020 | Al-Yami | E21B 33/14 |
| 2020/0123432 | A1 | 4/2020 | Shanbhag | |
| 2024/0093080 | A1* | 3/2024 | Lewis | C09K 8/467 |

* cited by examiner

Accelerated In-Situ $CO_2$ Mineralization as a Service
Renewables
Solar & Biofuel
Injection System
101
Monitoring System
103
$H_2O$
$H_2O$
Recovery
Mineralization
$CO_2$ + $H_2O$
Mafic/Ultramafic Rock
102
Direct Air Capture
(separate process)
Ambient
Air
$CO_2$ Surface casing
202
Cured cement
204
Injection casing
203
Injection
casing
Surface
casing
Cured
cement
Mafic
and/or
ultramafic
rocks
201
Matic/
ultramatic
rocks
Injection
tubing
207
Packer
208
Perforations
206
Open interval
(dotted region)
205
Mafic and/or
ultramafic rocks
201
Mafic and/or
ultramafic rocks
201
Case bottom

CEMENT SYSTEM FOR $CO_2$ INJECTION AND SEQUESTRATION IN MAFIC/ULTRAMAFIC ROCK AND METHOD OF USE

CROSS REFERENCE TO RELATED APPLICATION(S)

This application claims the benefit of U.S. Provisional Application No. 63/641,699, filed May 2, 2024, which is incorporated by reference in its entirety.

BACKGROUND

Field of the Invention

The present invention is related to an injection well bored in mafic and/or ultramafic rock formation for permanent carbon dioxide ($CO_2$) sequestration. More specifically, the present invention relates to cementing the injection well with a cementitious slurry mixture cured circumferentially between the mafic and/or ultramafic rock and a well casing. The present invention is also related to permanently sequestering carbon dioxide and subsequently storing carbon dioxide in a geological formation.

Description of the Related Art

Injection wells bored in underground geological formations have been used for oil and natural gas extraction for many years. Conventionally such wells have been used in oil- and/or natural gas-containing subterranean geologic formations mainly containing relatively soft and porous rocks such as sandstone, limestone and/or shale. Recently, there has been a significant interest in using injection wells for carbon dioxide sequestration, where such carbon capture technology has been developed to remove $CO_2$ from the atmosphere as an option for mitigating the anthropogenic greenhouse effect caused by the rising atmospheric $CO_2$ concentration. Boreholes used for extracting oil and gas extraction are drilled at any depth from near the surface to a depth of more than 6000 meters depending on the reservoir location. A well casing is placed in the drilled borehole leaving an annulus between the well casing and the wall of the borehole. The annulus may be filled with a cementitious material and cured to secure the casing in the borehole and seal the annulus. A well tubing is typically placed in the well casing for fluid transportation in and/or out of the well. The cementitious material used to seal the annulus in the injection well and maintain well integrity is typically formulated in a way that the cured cement exhibits high strength, good durability and high bonding strength to the rock.

Injection well integrity is important to achieving zonal isolation of liquids and gases from the different layers (strata) of rock along the depth of the well. Cementing the injection well in provides the mechanical support of the well, as well as a barrier between the injection well and the rock to prevent leaking and movement of liquids between different zones of the well.

Hydraulic fracturing is a conventional technique used to create fractures in the rock of geological formations in which oil and gas are trapped. The resulting fracture provides pathways for the oil and gas to travel into the injection well for extraction. In conventional practice, the well casing, cement, and well tubing may be perforated at selected zones to allow fluidic communication between the injection well and the rock. The well casing at the point of perforation may be cemented or uncemented. Fracking fluid is pumped into the well casing at a high pressure into the rocks through the perforated holes to thereby form new micro-fractures and/or enlarge and/or use existing fractures in the surrounding rocks. While the fracking liquid contains mainly water, it may also contain small solid particles such as sand and chemical additives. Some of the additives may pose a risk to human health and thus it is important to seal zones of the well to protect underground water sources that may be present in strata through which the well passes. The cement used for this purpose in conventional wells is formulated for use in relatively soft rocks such as sandstone, shale and limestone, having a Mohs scale hardness varied from 3 to 7.

When it comes to injection wells used for $CO_2$ sequestration, the conventional injection well structure poses several problems, especially with regard to the cement used to secure the well casing to the wellbore wall and seal the annulus. In contrast to oil and gas bearing geological formations, the underground geological formations that are most effective for $CO_2$ sequestration are comprised mainly of mafic and ultramafic rocks, e.g., largely silicate minerals having abundant divalent metal cations such as magnesium $Mg^{2+}$, calcium $Ca^{2+}$ and iron $Fe^{2+}$. Mafic and ultramafic rocks exhibit higher hardness (Mohs 5-7) compared to softer sedimentary rocks like shale (Mohs 1-4), and limestone (Mohs 3-4). However, they are compatible or slightly harder than sandstone (Mohs 6-7). The higher density of mafic and ultramafic rocks at 2.5-3.4 $g/cm^3$ require greater hydraulic pressures to initiate and propagate fractures compared to sandstone. This increases energy use, equipment wear, and operational costs for $CO_2$ sequestration well. Even without fracking, natural fractures in mafic and ultramafic rock permits $CO_2$ containing liquid passage, but their effectiveness depends on the rock reactivity. Ultramafic rocks react with $CO_2$-water to form stable carbonate minerals which seal fractures over time via mineral trapping. Whereas mafic rocks also react with $CO_2$Water, through more slowly, forming carbonates that may eventually reduce permeability. Moreover, $CO_2$-containing liquids may be acidic thereby presenting a risk of corrosion to the well casing, which is generally steel, as well as the cement. Cement formulations using in conventional extraction wells are not suitable for reliable long-lived $CO_2$ injection wells.

CN113716902A discloses a compact toughness anti-gas channeling cement slurry system suitable for low temperature solid well, wherein it comprises the following components according to weight parts: 100 parts of oil well cement, 0 to 25 parts of hollow glass microsphere, 2.0 to 5.0 parts of nanometer silicon dioxide, 2.5 to 12.0 parts of aqueous epoxy resin, 3.1 to 15.5 parts of aqueous epoxy curing agent, 0.6 to 1.2 parts of fluid loss agent, 0.40 to 0.85 parts of drag reducer; composite early strength agent 2.0~5.5 parts, antifoaming agent 0.2~0.6 parts, water 45~60 parts. While the cement slurry in this reference contains epoxy resin and additives like the present disclosure, the cement formulation focuses on low temperature cementing, not specific to mafic and ultramafic rocks.

US20200123432A1 discloses a composition comprising: (1) from about 10 to about 25 weight percent of a thermosetting resin based on the total weight of the composition; (2) from about 15 to about 25 weight percent of a filler based on the total weight of the composition; (3) from about 30 to about 70 weight percent of an aggregate based on the total weight of the composition; and (4) an amount of intercalatable nanoclay, an exfoliatable nanoclay, or a mixture thereof such that the composition when cured exhibits less crack propagation when subjected to stress than a comparable composition without said nanoclay. The cement formulation is not specific to mafic and ultramafic rocks.

Accordingly, it is an object of the present disclosure to provide an injection well bored in mafic and ultramafic rock used for carbon dioxide sequestration, with the annulus between the well casing and the rock filled with cured cement formulated with bio-based additives and epoxy resin, a cement mixture that provide good bonding, acid resistance, strength and durability in mafic and ultramafic rock, a method of forming a CO2 injection well and injection CO2 to sequester CO2 underground.

SUMMARY OF THE INVENTION

The present disclosure provides a method of cementing a $CO_2$ injection well bored in an underground geological formation formed of mafic and/or ultramafic rock for $CO_2$ sequestration, with an annulus between a well casing and an injection well wall filled with a cured cement formulated with bio-based additives and epoxy resins. The present disclosure also provides an injection well bored in an underground geological formation formed of mafic and/or ultramafic rock for $CO_2$ sequestration, with an annulus between a well casing and an injection well wall filled with a cured cement formulated with bio-based additives and epoxy resins.

One aspect of the present disclosure is a method of cementing a $CO_2$ injection well used for $CO_2$ sequestration. The method may include injecting a cementitious slurry mixture into an annulus between a well casing and an injection well wall. The cementitious slurry mixture may comprise a class G cement, a fly ash, a microsilica, the bio-based additives and an epoxy resin blend. The cementitious slurry mixture may fill the annulus between the well casing and the injection well wall, an annulus between the well casing and a surface casing having a wider diameter than the well casing, and an annulus between the surface casing and the injection well wall. The method of cementing a $CO_2$ injection well may also include curing of the cementitious slurry mixture after the injecting to form a cured cement. The cured cement may exhibit a higher bonding strength and a longer durability in terms of strength retention compared to a conventional cement formulation used to cement a $CO_2$ injection well.

In a further embodiment, the class G cement in the cementitious slurry mixture may contain $SiO_2$, $Al_2O_3$, $Fe_2O_3$, CaO, MgO, $Na_2O$, $SO_3$ and MnO, and has a relatively low Loss On Ignition (LOI) value. The fly ash in the cementitious slurry mixture may contain $SiO_2$, $Al_2O_3$, $Fe_2O_3$, CaO, MgO, $Na_2O$, $SO_3$ and MnO, and has a relatively low Loss On Ingnition (LOI) value. The microsilica in the cementitious slurry mixture may contain $SiO_2$, $Al_2O_3$, $Fe_2O_3$, CaO, MgO, $Na_2O$, $SO_3$ and MnO, and has a relatively low Loss On Ignition (LOI) value.

In a further embodiment, the additives may contain a cement retarder, a dispersant, a fluid loss control agent, a degassing agent, a defoamer and an extender. The additives may also contain one or more bio-based materials selected from a group consisting of cellulose, starch, chitin, chitosan and protein.

In a further embodiment, the epoxy resin blend may contain a mixture of epoxy resins. An epoxy resin comprising bisphenol A-based diglycidyl ether may be present. An epoxy resin comprising a mixture of an aromatic alcohol and one or more amines may be present, where the aromatic alcohol may be benzyl alcohol, and the amines may be one or more diamines selected from linear alkyl diamine, cyclic alkyl diamine, piperazine and piperazine derivatives and epoxy-based diamines. An epoxy resin comprising 1,4-butanediol diglycidyl ether may be present.

In a further embodiment, the cementitious slurry mixture is preferably obtained by forming a cement slurry, followed by mixing the cement slurry with the epoxy resin blend for a sufficient amount of time to form a homogeneous cementitious slurry mixture. The cement slurry is preferably obtained by mixing the additives with water first, followed by mixing the class G cement, the fly ash and the microsilica to form the homogeneous cement slurry. The epoxy resin blend is preferably obtained by mixing several epoxy resins in a particular order to form the homogeneous epoxy resin blend.

In a further embodiment, the cementitious slurry mixture may be injected into the annulus between the well casing and the injection well wall in a bottom-up way via by pumping under a controlled pressure. After injection, another pressure may be applied to the cementitious slurry mixture to ensure the cementitious slurry mixture is placed properly without any leakage or injection well failure.

In a further embodiment, a bottom portion of the $CO_2$ injection well is preferably uncemented.

In a further embodiment, the cementitious slurry mixture may be cured at an elevated temperature for a sufficient amount of time.

In a further embodiment, the cured cement may exhibit a higher bonding strength, compressive strength and corrosion resistance than a conventional class G cement.

In a further embodiment, a $CO_2$-containing fluid may be injected into the $CO_2$ injection well, and the $CO_2$-containing fluid is preferably acidic and may comprise water.

In a further embodiment, the $CO_2$ in the $CO_2$-containing fluid may react with the mafic and/or ultramafic rock in the underground geological formation. The mafic and/or ultramafic rock may contain olivine and pyroxene, and may have a higher density compared to limestone.

Another aspect of the present disclosure is an injection well bored in a mafic and/or ultramafic rock used for carbon dioxide sequestration. The injection well may include a surface casing in a borehole section having a wide diameter, and an injection casing into a depth of a borehole. The injection casing may have an open interval at a first depth in the injection well permitting fluid communication from an interior of the injection casing into the mafic and/or ultramafic rock. The injection casing may be extended to a bottom of the open interval, where the injection casing may have perforated holes in it. The open interval may also be free of the injection casing. An injection tubing is preferably disposed in the interior of the injection casing having fluid communication with the interior of the injection casing. A packer connected to the injection tubing may be present at a second depth in the injection well, the packer forming a seal between an upper space inside the injection casing and the open interval. A cured cement may be present between the mafic and/or ultramafic rock and the injection casing and may be cured from a cementitious slurry mixture comprising a class G cement, a fly ash, a microsilica, additives, and an epoxy resin blend. The cured cement may exhibit a higher bonding strength and a longer durability in terms of strength retention compared to a conventional cement formulation used to cement an injection well.

In a further embodiment, the open interval is in the bottom space of the injection well.

In a further embodiment, the cured cement may be circumferentially continuous between the mafic and/or ultramafic rock and the injection casing between the first depth and the second depth of the well casing in a case where the injection casing with perforated holes is extended to the bottom of the open interval.

In a further embodiment, the mafic and/or ultramafic rock adjacent the open interval of the well casing having the injection casing with the perforated holes is preferably free of the cured cement.

In a further embodiment, the mafic and/or ultramafic rock adjacent the open interval of the well casing free of the injection casing is preferably free of the cured cement.

Another aspect of the present disclosure is an improved injection well bored in an underground geological formation formed of mafic and/or ultramafic rock. The improved well includes an injection casing and an injection tubing and is used to inject $CO_2$-containing fluid through the injection tubing into the underground geological formation to enter naturally occurring fractures in the underground geological formation, where the $CO_2$ present in the $CO_2$-containing fluid is reacted with the mafic and/or ultramafic rock. The improved injection well may include a surface casing in a borehole section having a wide diameter, and an injection casing into a depth of a borehole. The injection casing may have an open interval at a first depth in the injection well permitting fluid communication from an interior of the injection casing into the mafic and/or ultramafic rock. The injection casing may be extended to a bottom of the open interval, where the injection casing may have perforated holes in it. The open interval may also be free of the injection casing. An injection tubing is preferably disposed in the interior of the injection casing having fluid communication with the interior of the injection casing. A packer connected to the injection tubing may be present at a second depth in the injection well, the packer forming a seal between an upper space inside the injection casing and the open interval. A cured cement may be present between the mafic and/or ultramafic rock and the injection casing and may be cured from a cementitious slurry mixture comprising a class G cement, a fly ash, a microsilica, additives, and an epoxy resin blend. The cured cement may exhibit a higher bonding strength and a longer durability in terms of strength retention compared to a conventional cement formulation used to cement an injection well.

In a further embodiment, the mafic/ultramafic rock may contain olivine and pyroxene and may have a high density.

In a further embodiment, the mafic and/or ultramafic rock at the first depth of the injection casing may undergo a serpentinization process to form a serpentinite rock. The serpentinite rock may have a lower density than the mafic and/or ultramafic rock, naturally occurring fractures may exist in the serpentinite rock.

BRIEF DESCRIPTION OF THE DRAWINGS

The drawings show embodiments of the disclosed subject matter for the purpose illustrating the invention. However, it should be understood that the present application is not limited to the precise arrangements and instrumentalities shown in the drawings, wherein.

DETAILED DESCRIPTION

Geological $CO_2$ sequestration can be divided into two methods. The first method is underground storage where supercritical $CO_2$ compressed to a high pressure is directly injected and stored underground at a density of 600 to 800 $kg/m^3$. The choice of an injection site depends on rock porosity, rock permeability, absence of faults, and geometry of rock layers. Ideally $CO_2$ is injected to a site where rocks with high porosity and permeability exist. An example of $CO_2$ storage rock may include sandstone, which has a permeability from 1 to $10^{-5}$ Darcy and a porosity as high as 30%. Additionally, the porous and permeable rocks need to be capped by a layer of caprock with low permeability acting as a seal. An example of caprock may include shale with a permeability of $10^{-5}$ to $10^{-9}$ Darcy. Once injected, $CO_2$ will rise due to its low density compared to the surrounding rocks; when it encounters the caprock, it will spread laterally until it reaches a gap. If any fault planes exist near the injection zone, $CO_2$ may migrate along the fault to the surface, leaking back into the atmosphere. While trapped in a rock formation, $CO_2$ may remain in the supercritical phase and/or dissolve in water or hydrocarbons present in subterranean geologic formations. Underground $CO_2$ storage methods typically require the use of an injection well having a high mechanical strength to stand the pressure and temperature of supercritical $CO_2$.

Another method targets $CO_2$ mineralization to permanently hold $CO_2$ in the form of carbonate rock. While $CO_2$ can react with certain underground rock formations in the presence of water to form carbonate, the rock layer must exhibit high permeability, contain a penetrating fracture network, and/or be capable of forming the fractures needed to accommodate the flow and reaction of a $CO_2$ bearing fluid. Relatively soft rocks such as sandstone and limestone have a high permeability; however, in the case of hard rocks, permeability enhancement via hydraulic fracturing may be needed to artificially stimulate fracture growth. Hydraulic fracturing has conventionally been utilized to form fractures in softer hydrocarbon-bearing rock formations. This technique requires injecting a fracking fluid at a high pressure and fast injection rate to create new fractures or stimulate growth of existing fractures. Hydraulic fracturing has been extensively studied in hydrocarbon-bearing sedimentary rocks. In the conventional hydraulic fracturing practice, no chemical reaction (e.g., no formation of chemical bonds) takes place between the fracking fluid and the rocks; only permeability is enhanced with the presence of fractures though some dissolution may also occur.

Figure 1:
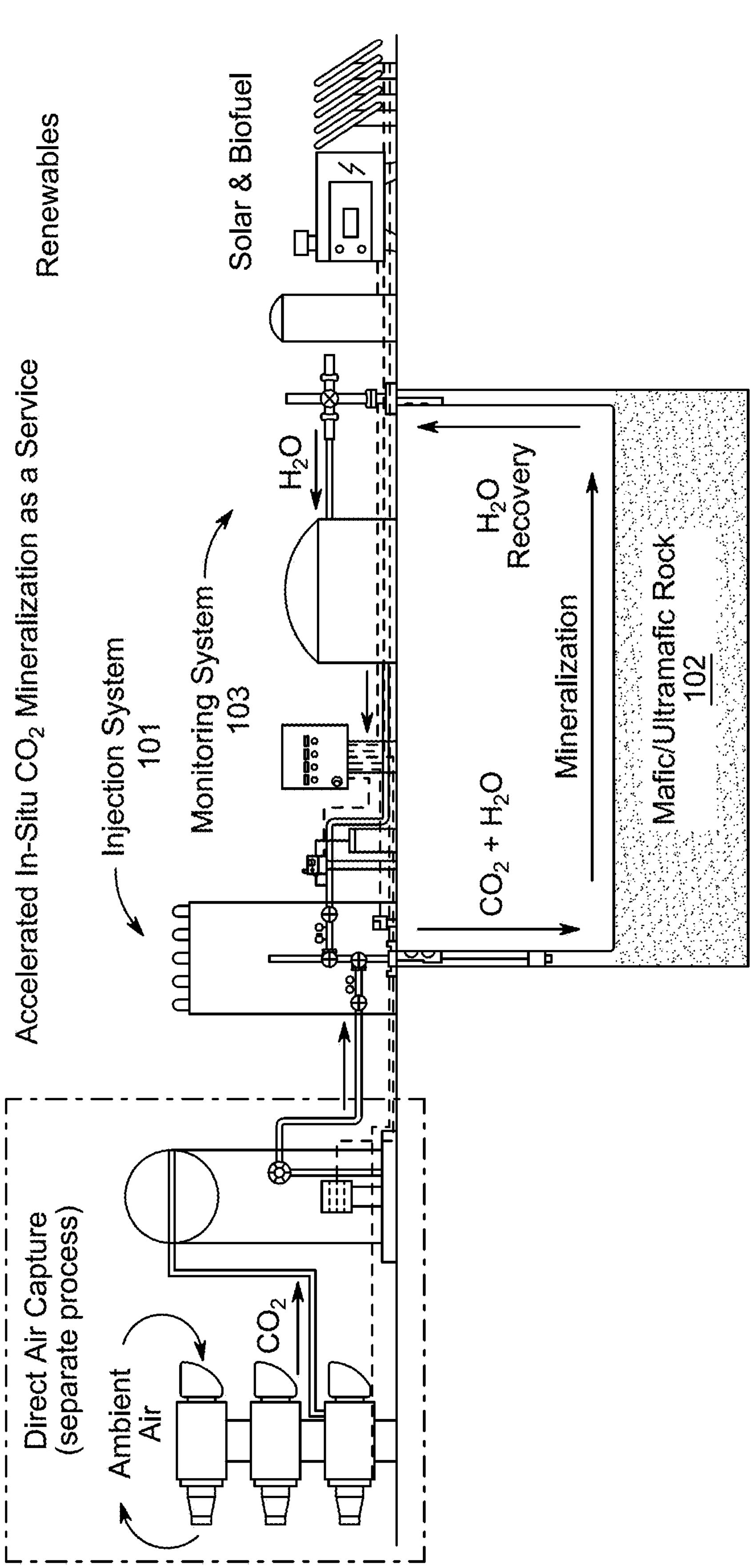
FIG. 1: is a schematic process flow diagram of a system and method where the embodiments of the disclosed subject matter are applied.

Referring to FIG. 1, embodiments of the present disclosure are described with an injection system 101 used to inject a $CO_2$ containing liquid into underground geological formations for sequestering $CO_2$ via in situ carbonation of a mafic and/or ultramafic rock 102. The injection system comprises a borehole drilled in the mafic and ultramafic rock, preferably to a depth of 500 to 1500 meters, an injection well formed in the borehole, and related pumping equipment for injecting the $CO_2$ containing fluid. A monitoring system 103 is used to monitor a reaction rate of $CO_2$ carbonation. The $CO_2$ containing fluid may be obtained via a separate process including a direct air capture shown in FIG. 1 The $CO_2$ may be obtained from any source such as from industrial plants or through other processes that concentrate and/or dissolve atmospheric or captured $CO_2$.

Some embodiments of the present disclosure include a method of cementing a $CO_2$ injection well bored in an underground geological formation formed of mafic and/or ultramafic rock. The $CO_2$ injection well may be constructed in several steps. A borehole is first drilled at a first diameter of up to 15 inches and a depth of about 100 to 500 m, preferably at a depth below the lowermost underground source of drinking water at a range of 19 to 50 m, or depth of uppermost soft rock where a steel pipe called surface casing is installed to line the full length of the borehole. The surface casing is cemented circumferentially between an outer surface of the surface casing and the borehole wall. The borehole is further drilled at a narrower diameter of up to 10 inches into or through a targeted injection zone. After drilling is complete, an additional protective casing called injection casing is installed from the surface casing down into the targeted injection zone, with at least a portion of the length of an outer surface of the injection casing circumferentially cemented, between an inner surface of the surface casing and an outer surface of the well casing, and further down between an outer surface of the injection casing and the borehole. After the cement is properly cured, both the casings and the cured cement preferably undergo a series of mechanical integrity tests to ensure that the cured cement has bonded properly to the casings and to the borehole.

An open interval refers to a portion of the $CO_2$ injection well from a first depth of the $CO_2$ injection well to a depth lower than the first depth, preferably a bottom portion of the injection well, where the targeted injection zone is located. The open interval is preferably uncemented to permit fluidic communication into the underground geological formation formed of mafic and/or ultramafic rock from the borehole. The fluidic communication may happen when the injection casing with perforated holes is extended into the open interval, where the perforations provide a pathway for the $CO_2$ containing fluid to enter the mafic and/or ultramafic rock from the interior space of the injection casing. The fluidic communication may also happen when the open interval is free of the injection casing and preferably free of cementing, where the $CO_2$ containing fluid enters the mafic and/or ultramafic rock directly.

A packer is placed inside the injection casing at the first depth of the injection casing, and a pipe having a smaller diameter than the injection casing called an injection tubing is placed inside the injection casing. The packer seals the annulus between the inner surface of the well casing and the outer surface of the well tubing. The space between the injection casing and the injection tubing is called the annulus, is filled with a liquid called annular liquid such as a bentonite-based drilling mud and/or a hydrocarbon-based material such as crude oil or diesel. When the packer expands tightly against an inner surface of the injection casing and against the injection tubing, it forms a seal isolating the open interval from the annulus above the packer.

In a preferred embodiment, the $CO_2$ injection well is cemented via injecting and curing of a cementitious slurry mixture into an annular space between a well casing and an injection well wall to form a cured cement. The cementitious slurry mixture comprises a class G cement, a fly ash, a microsilica, a plurality of additives and an epoxy resin blend, formulated in a way that the cured cement has strong bonding strength between the well casing and the injection well wall, and exhibits good durability after exposure to the $CO_2$ containing fluid to ensure well integrity of the $CO_2$ injection well.

Class G cement is composed of tricalcium silicate and dicalcium silicate and is commonly used in the oil and gas drilling industry to serve important functions such as providing support for the underground well, shielding against corrosive substances, and maintaining the integrity of different well zones. However, when it comes to dealing with the $CO_2$ containing fluid, the class G cement encounters significant challenges. $CO_2$ weakens the class G cement, an effect which becomes more pronounced with increased $CO_2$ concentration, temperature and pressure. Consequently, cured compositions formed from class G cement may degrade over time, affecting the durability and safety of the well. In particular, the bonding between the class G cement and a well casing, and/or between the class G cement and an underground geological formation may weaken and erode. Therefore, formulations of a traditional class G cement may not have the strength and durability needed for a $CO_2$ injection well.

Conventional class G cement-based formulations were developed for use in hydrocarbon-containing geologic formations in relatively soft rock formations such as shale, limestone, and sandstone. Conventional Class G cement formulations are designed to bond to the porous and relatively soft rock present such formations. Rock formations having different properties such as lower porosity, lower permeability, fracture density, hardness and density do not provide the same bonding to conventional class G-based cements that is exhibited in soft rock. As a consequence, the use of conventional cement formulations for cementing in bore holes in the mafic/ultramafic rock formations used for $CO_2$ injection, may be more susceptible to debonding and the formation of channels between rock and cement which may compromise the seal between annulus and wellbore wall, and/or between upper and lower portions of interior spaces in the injection casing. Conventional cement formulations present a substantial risk of $CO_2$ leakage and well failure due to structural disintegration at the pressures and acidic conditions often encountered during $CO_2$ injection/sequestration operations.

The class G cement used in the cementitious slurry of the present disclosure is preferably a mixture that contains 18-22 wt % of $SiO_2$, 2-4 wt % of $Al_2O_3$, 3-5 wt % of $Fe_2O_3$, 58-64 wt % of CaO, 1-3 wt % of MgO, 0.1-0.5 wt % of $Na_2O$, 4-6 wt % of $SO_3$, and 0.2-0.4 wt % of MnO, and exhibits a low Loss On Ignition (LOI) value of 2-3 wt %, while the wt % is calculated based on the total weight of the class G cement. The class G cement in the cementitious slurry mixture has a weight of 60 to 80 wt % based on the total weight of the cementitious slurry mixture.

Fly ash is a finely divided residue that is a byproduct obtained from the combustion of coal. In most cases fly ash is sent to landfill with no recourse for recycling. However, fly ash cement is a cost-effective option that reduces the amount of hazardous waste affecting the environment. The presence of fly ash in cement reduces the occurrence of cracking, creating a dense cement that is resistant to sulphates and alkali-aggregate reactions. Cement containing fly ash requires less water for curing and tends to resist shrinking. A class F fly ash designated according to ASTM C 618 standard and originated from anthracite and bituminous coals is chosen in the cementitious slurry mixture over a class C fly ash originated from sub-bituminous or lignite coals due to a reason of composition. The class F fly ash contains 45 to 50 wt % of $SiO_2$, 20 to 23 wt % of $Al_2O_3$, 10 to 13 wt % of $Fe_2O_3$, 9 to 10 wt % of CaO, 4 to 5 wt % of MgO, 1 to 3 wt % of $Na_2O$, 0.3 to 0.5 wt % of $SO_3$ and 0.1 to 0.3 wt % of MnO, and exhibits a low Loss On Ignition (LOI) value of 0.3 to 0.4 wt %, while the wt % is calculated based on the total weight of the fly ash. A low amount of CaO (9 to 10 wt %) in the class F fly ash compared to that of the class C fly ash (15 to 30 wt %) reduces the formation of calcium hydroxide, a byproduct of cement hydration, which further forms a porous calcium carbonate upon reacting with $CO_2$ and reducing the strength in the cured cement. The class F fly ash in the cementitious slurry mixture also exhibits a pozzolanic activity by reacting with the calcium hydroxide byproduct and forming a cementitious calcium silicate hydrate (C—S—H) to avoid formation of porous calcium carbonate, which is essential to enhance the strength and reduce the permeability in the cured cement. The fly ash in the cementitious slurry mixture has a weight of 10 to 35 wt % based on the total weight of the class G cement, the fly ash, the microsilica, the additives and the epoxy resin blend.

Microsilica, also known as silica fume, is a byproduct from silicon metal or ferrosilicon production, generated as a gas in submerged electrical arc furnaces during the reduction of pure quartz. As the molten metal is produced, a silica-based gas is emitted. As the gaseous fume rises, it cools rapidly and forms extremely minute, amorphous, spherical particles. The microsilica in the cementitious slurry mixture contains 90 to 95 wt % of $SiO_2$, 0.3 to 0.4 wt % of $Al_2O_3$, 0.005 to 0.009 wt % of $Fe_2O_3$, 1.5 to 1.8 wt % of CaO, 0.2 to 0.3 wt % of MgO, 0.05 to 0.10 wt % of $Na_2O$, 0.4 to 0.5 wt % of $SO_3$, and 0.1 to 0.2 wt % of MnO, while the wt % is calculated based on the total weight of the microsilica. The microsilica has an average 0.1 to 0.3 microns in diameter, much smaller compared to cement particles, and fills up voids in the cured cement, of which the permeability is reduced. The microsilica also exhibits a pozzolanic activity similar to the fly ash. The microsilica in the cementitious slurry mixture has a weight of 1 to 5 wt % based on the total weight of the class G cement, the fly ash, the microsilica, the additives and the epoxy resin blend, and a preferable weight of 3 to 5 wt %, where the microsilica is shown to enhance an early-stage strength of the cured cement via accelerating a pozzolanic reaction of converting calcium hydroxide byproducts into the dense cementitious calcium silicate hydrate.

Additives in the cementitious slurry mixture have a total weight of 1 to 5 wt % based on the total weight of the class G cement, the fly ash, the microsilica, the additives and the epoxy resin blend. Additives may include a cement retarder, a dispersant, a fluid loss control agent, a degassing agent, a defoamer and an extender, and contain one or more bio-based materials derived from cellulose, starch, chitin, chitosan or protein. The additives may be purchased from commercial vendors such as Global Drilling Fluids and Chemical Ltd, Euclid Chemical, Sika, and Universal Drilling Fluids. A cement retarder controls the setting time of slurry to ensure proper placement before curing and to prevent premature slurry thickening in the injection well. Such cement retarders have a working temperature tailored to different temperatures in the underground geological formations. Examples of cement retarders include sodium chloride (at high concentration), lignosulfonate derived from lignin in wood waste, cellulose derivatives such as hydroxyethyl cellulose (HEC) and carboxymethylhydroxyehtyl cellulose (CMHEC), and hydroxycarboxylic acid including citric acid, tartaric acid, gluconic acid, glucoheptonate, glucono delta-lactone. A dispersant having a moisture content below 5% reduces the viscosity of slurry and improves the flowability by reducing friction, while maintaining a uniform component distribution throughout placement. Such dispersant also has a working temperature tailored to different temperatures in the underground geological formations, where water loss prevention is critical in both high and low temperature environment. Conventional dispersants include sulfonated naphthalene formaldehyde condensates or sulfonated melamine formaldehyde condensates, and various polymer-based dispersants have been developed to replace conventional dispersants. A fluid loss control agent helps minimize water loss to prevent premature cement dehydration and shrinkage cracks. Common fluid loss control agents are polymer-based, such as cellulose and cellulose derivatives, polyvinyl alcohol, polyalkanolamines, polyacrylamides, and liquid latex. A degassing agent is a latex polymer enhancing cement $CO_2$ resistance to reduce $CO_2$ leakage. A defoamer prevents excessive foaming formation in the slurry during the mixing step and further ensures consistent density and mechanical strength throughout the cured cement. Examples of defoamer agents are silicone, alcohol, or polyglycol based polymers. An extender reduces density of the cured cement and improves bonding of the cured cement between the well casing and the rock formations. Common extenders include clay, sodium silicates, pozzolans and light weight particles. A combination of the additives provides the required processability of the cementitious slurry mixture to be injected into the injection well, and eventually aides the required mechanical strength, bonding ability and durability of the cured cement to support the well casing. The wt % of additives in the cementitious slurry mixture is calculated based on the total weight of the class G cement, the fly ash, the microsilica, the additives and the epoxy resin blend, where the amount of the cement retarder is 0.1 to 0.5 wt %, the amount of the dispersant is 0.1% to 2 wt %, the amount of the fluid loss control agent is 0.1% to 2 wt %, the amount of the degassing agent is 0.1% to 2 wt %, the amount of the defoamer is 0.1% to 2 wt %, and the amount of the extender is 0.05% to 1 wt %.

The epoxy resin blend in the cementitious slurry mixture of the present disclosure is present in an amount of 10-15 wt. % based on the total weight of the class G cement, the fly ash, the microsilica, the additives and the epoxy resin blend. Generally, an epoxy resin contains two parts that are mixed prior to application, a liquid prepolymer and a curing agent. The liquid prepolymer is an oligomer of low molecular weight, and upon crosslinking in the presence of the curing agent, it forms an interconnected network of high molecular weight, the process of which is termed curing. An example of a liquid prepolymer is a prepolymer condensed from epichlorohydrin and bisphenol A (2,2'-bis(4-hydroxy-phenyl) propane). The degree of polymerization of such prepolymer may be varied from 2 to 20, preferably 4 to 16 or 6 to 12 where a liquid is formed at a low degree of polymerization, and solids which soften at a high temperature are formed at a high degree of polymerization. The epoxy resin blend in the cementitious slurry mixture is formulated to comprise a mixture of several epoxy resins, epoxy resin A, epoxy resin B and epoxy resin C. An epoxy resin A preferably comprises a liquid prepolymer, e.g., bisphenol A-based diglycidyl ether, which upon curing exhibits a high mechanical strength, thermal stability, and chemical resistance. The epoxy resin A has a relatively low viscosity and a high reactivity to a curing agent, which facilitates a uniform dispersion of the epoxy resin blend within the cementitious slurry mixture. An epoxy resin B is a curing agent, preferably comprising a mixture of an aromatic alcohol and several amines. One example of the aromatic alcohol is benzyl alcohol, and the amines may be one or more diamines selected from the group consisting of linear alkyl diamine, cyclic alkyl diamine, piperazine and piperazine derivatives and epoxy-based diamines. The epoxy resin B functions as the curing agent at an ambient to moderate temperature, and the molecular structure of the epoxy resin B provides a densely crosslinked epoxy network of upon curing. An epoxy resin C is also a liquid prepolymer preferably comprising 1,4-butanediol diglycidyl ether, where its low viscosity can be utilized to adjust the viscosity of the cementitious slurry mixture. The linear alkyl chain structure of the epoxy resin C also provides flexibility to the cured cement.

In a preferred embodiment of the present disclosure, the cementitious slurry mixture is obtained in several steps. A cement slurry is first formed by mixing the additives with water until the additives are fully dissolved, followed by gradually adding the class G cement, the fly ash and the microsilica under continuous stirring to form a homogeneous slurry. The epoxy resin blend is separately blended by mixing the epoxy resins in the order of epoxy resin A, epoxy resin B and epoxy resin C. Prior to the injecting of the cementitious slurry mixture into the annulus, the cement slurry is mixed with the epoxy resin blend for a sufficient amount of time of 4 to 5 minutes to form the homogeneous cementitious slurry mixture.

In a preferred embodiment, the cementitious slurry mixture is injected in a bottom up manner to fill the annulus from the first depth of the $CO_2$ injection well up to a second depth of the $CO_2$ injection well. The injection is performed by pumping under a controlled pressure. After the cementitious slurry mixture is in place, a testing pressure of about 3000 psi is applied to ensure that the cementitious slurry mixture is placed properly and that no leakage or injection well failures is present before curing the cementitious slurry mixture. Furthermore, the terms "approximately," "approximate," "about," and similar terms generally refer to ranges that include the identified value within a margin of 20%, 10%, or preferably 5%, and any values therebetween.

In a preferred embodiment, the injected cementitious slurry mixture is cured at a temperature of 50 to 70° C. for a period of 4-10 hours. The cured cement bonds the well casing to the mafic and/or ultramafic rock, having a density of 2.0 to 2.8 g/cm$^3$. A bonding strength of the cured cement to bond the well casing and the mafic and/or ultramafic rock is measured according to ASTM C109 standard (C109M-20, Mar. 12, 2020 version) at Day 3 and Day 7 of the curing. The cured cement preferably exhibits a bonding strength of 270 to 290 bar at Day 3 of the curing, and the bonding strength further increases to preferably 350 to 400 bar at Day 7 of curing. The bonding strength of the cured cement in the present invention is improved by 5 to 30%, preferably 10 to 25% or 15 to 20%, compared to a conventional cured cement used in cementing a CO2 injection well. A compressive strength of the cured cement is measured according to ASTM C39 standard at Day 7 of the curing. The cured cement preferably exhibits a compressive strength of 300 to 500 bar, preferably 310 to 450 bar, 320 to 400 bar or most preferably 330 to 350 bar at Day 7 of curing. The compressive strength of the cured cement in the present invention is improved by 5 to 50%, preferably 10 to 30%, compared to a conventional cured cement used in cementing a CO2 injection well. A durability of the cured cement is measured as a strength retention value after exposure to CO2 containing fluid, and the cured cement exhibits a strength retention of at least 97% after up to 7 days exposure to CO2 containing fluid, indicating a good durability of the cured cement.

In a preferred embodiment, the underground geological formation comprises mafic and/or ultramafic rock. Both mafic and ultramafic rock belong to the family of igneous rock, formed from cooling and solidification of magma or lava. Mafic and ultramafic rocks are distinctive in their compositions and characteristics. Mafic rock has a dark color due to the presence of high magnesium and iron content, with approximately 45% to 52% silica by weight, dominated by specific silicate minerals such as pyroxene, calcium-rich plagioclase, and a minor amount of olivine. Examples of mafic rock include basalt, a fine-grained volcanic rock found primarily in oceanic crust, and gabbro, a coarse-grained intrusive rock that corresponds to basalt with similar minerals but crystallized at a slower rate. Ultramafic rock is abundant in magnesium, but with a much lower silica content of less than 45%. The compositions of ultramafic rock are mostly olivine and pyroxene. An example of ultramafic rock includes peridotite, a coarse-grained rock dominant in the upper mantle of Earth. Olivine and pyroxene that are present in mafic and ultramafic rocks react with $CO_2$ in the presence of water. Olivine often comprises magnesium, oxygen, and silicon, with a usual combination of $SiO_4$ and $Mg^{2+}$. Typically, silicon bonds with 4 oxygen molecules forming a pyramid structure so that the charges of cations and anions are balanced, and $Mg^{2+}$ occupies the empty space between the $SiO_4$ structure. On the other hand, pyroxene is an inosilicate mineral. The general chemical formula for pyroxene is $AB(Si)_2O_6$, in which A can be an ion like magnesium, aluminum, etc. Most commonly, pyroxene can be found as $CaMg(SiO_3)_2$. $CO_2$ can react with olivine and pyroxene to form carbonate minerals of calcite and magnesite, turning olivine and pyroxene into serpentine, a process commonly known as serpentinization, which occurs naturally in the presence of water. A reaction pathway is shown as follows:

[1]

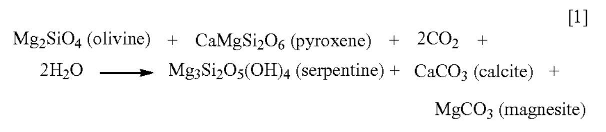

One aspect of serpentinization is volume increase, i.e. a decreased density from 2.5 to 3.4 g/cm$^3$ of a mafic and/or ultramafic rock to 2.1 to 2.9 g/cm$^3$ of a serpentinite rock, resulting in the occurrence of brittle fractures within the rock. Several examples include a mafic rock of basalt and an ultramafic rock of peridotite having a density of 2.5 to 3.4 g/cm$^3$, while upon serpentinization of an ultramafic rock harzburgite, the serpentinite harzburgite has a density of 2.5 to 2.8 g/cm$^3$, which is similar to rocks having a carbonatitic composition, an example of which is limestone. Densities of various rock types are provided in Table 1. Due to its high density, mafic and ultramafic rock has a relatively low porosity of 1 to 10%, preferably 2 to 8% or 4 to 6%, compared to rocks such as limestone. An increase in porosity results in a decrease in density, indicating an increase in an opening of cracks and fractures, which happens during serpentinization.

TABLE 1

Rock Density

| Rock | Density (gm/cm$^3$) |
|---|---|
| Andesite | 2.5-2.8 |
| Basalt | 2.8-3.0 |
| Coal | 1.1-1.4 |
| Diabase | 2.6-3.0 |
| Diorite | 2.8-3.0 |
| Dolomite | 2.8-2.9 |

TABLE 1-continued

| Rock Density | |
| --- | --- |
| Rock | Density ($gm/cm^3$) |
| Gabbro | 2.7-3.3 |
| Gneiss | 2.6-2.9 |
| Granite | 2.6-2.7 |
| Gypsum | 2.3-2.8 |
| Limestone | 2.3-2.7 |
| Marble | 2.4-2.7 |
| Mica schist | 2.5-2.9 |
| Peridotite | 3.1-3.4 |
| Quartzite | 2.6-2.8 |
| Rhyolite | 2.4-2.6 |
| Rock salt | 2.5-2.6 |
| Sandstone | 2.2-2.8 |
| Shale | 2.4-2.8 |
| Slate | 2.7-2.8 |

Another aspect of serpentinization is mineral composition. The ultramafic rock such as peridotite contains olivine and pyroxene with serpentine and brucite appearing as the secondary minerals during serpentinization, while the mafic rock such as basalt contains plagioclase feldspar with olivine and a minor pyroxene with secondary minerals of zeolite, serpentine, and carbonate minerals resulting from hydrothermal alteration. These subtle differences in mineral composition affect the mechanical properties of the rocks such that serpentine and brucite lower the hardness of altered mafic and/or ultramafic rock. When chemical weathering of serpentinization happens naturally near the surface of mafic and ultramafic rock, a pervasive fracture and vein network is generated, primarily filled with carbonate minerals, with a rock matrix containing micro to nanopores. It also indicates that such veins filled with calcium and magnesium carbonate minerals decrease rapidly with depth, therefore deeper subsurface below the weathering horizon has a potential for engineered carbon dioxide sequestration. The mafic and ultramafic rock, however, has a low permeability of $10^{-15}$ to $10^{-18}$ Darcy, which normally requires certain permeability enhancement via industrial hydraulic fracturing to accommodate the flow of $CO_2$ containing fluid. The injection well in the present disclosure, however, involves no prior mechanical hydraulic fracturing; fractures in the underground mafic and/or ultramafic rock propagates naturally upon serpentinization. A $CO_2$ containing fluid is injected through the injection tubing at a pressure substantively less than that of hydraulic fracturing and communicates with the mafic and/or ultramafic rock through the open interval to form a serpentinite rock, which further forms a pervasive fracture and vein network filled with carbonate minerals while carbon dioxide is sequestered.

In a preferred embodiment, the $CO_2$ containing fluid comprising water and $CO_2$ is injected into the $CO_2$ injection well below the first depth and enters the open interval, where acidic $CO_2$ containing fluid flows through the perforated holes of the injection casing and become in contact with the mafic and/or ultramafic rock, or directly become in contact with the mafic and/or ultramafic rock in the absence of the injection casing. $CO_2$ reacts with the mafic and/or ultramafic rock which contains olivine and pyroxene.

Some embodiments of the disclosed invention include an injection well used to place the $CO_2$ containing fluid underground into porous geologic formations, and it is constructed in several steps. A borehole is first drilled at a diameter of up to 15 inches and a depth of up to 500 m, preferably at a depth below the lowermost underground source of drinking water at a range of 19 to 50 m, where a steel pipe called surface casing is installed to line the full length of the borehole. The surface casing has a diameter of 7 to 15 inches and a length of 100 to 500 m. The surface casing is cemented circumferentially between an outer surface of the surface casing and the borehole. The borehole is further drilled at a narrow diameter of up to 10 inches into or through a targeted injection zone. After drilling is complete, an additional protective casing called injection casing is installed from the surface casing down into the targeted injection zone, with an outer surface of the injection casing circumferentially cemented, between an inner surface of the surface casing and an outer surface of the injection casing, and further down between an outer surface of the injection casing and the wellbore. The injection casing has a diameter of 4.5 to 10 inches and a length of 100 to 900 m. After the cement is properly cured, both the casings and the cured cement undergo a series of mechanical integrity tests to assure that the cured cement has bonded properly to the casings and to the wellbore.

An open interval refers to a bottom portion of the injection well from a first depth of the injection well to a depth lower than the first depth, where the targeted injection zone is located. The open interval is uncemented to permit fluidic communications into the underground geological formation, which is formed of mafic and/or ultramafic rock. The fluidic communication may happen when the injection casing with perforated holes is extended into the open interval, where the perforated holes provide a pathway for fluid to enter the mafic and/or ultramafic rock. The fluidic communication may also happen when the open interval is free of the injection casing, where the $CO_2$ containing fluid enters the mafic and/or ultramafic rock directly. A packer is placed inside the injection casing at the first depth of the injection casing, and a pipe having a smaller diameter than the injection casing called an injection tubing is placed inside the injection casing. The packer seals the annulus between the inner surface of the well casing and the outer surface of the well tubing. The space between the injection casing and the injection tubing is called annulus, filled with a liquid called annular liquid such as a bentonite-based drilling mud. When the packer expands tightly against an inner surface of the injection casing and against the injection tubing, it forms a seal isolating the open interval from the annulus above the packer.

Figure 2:
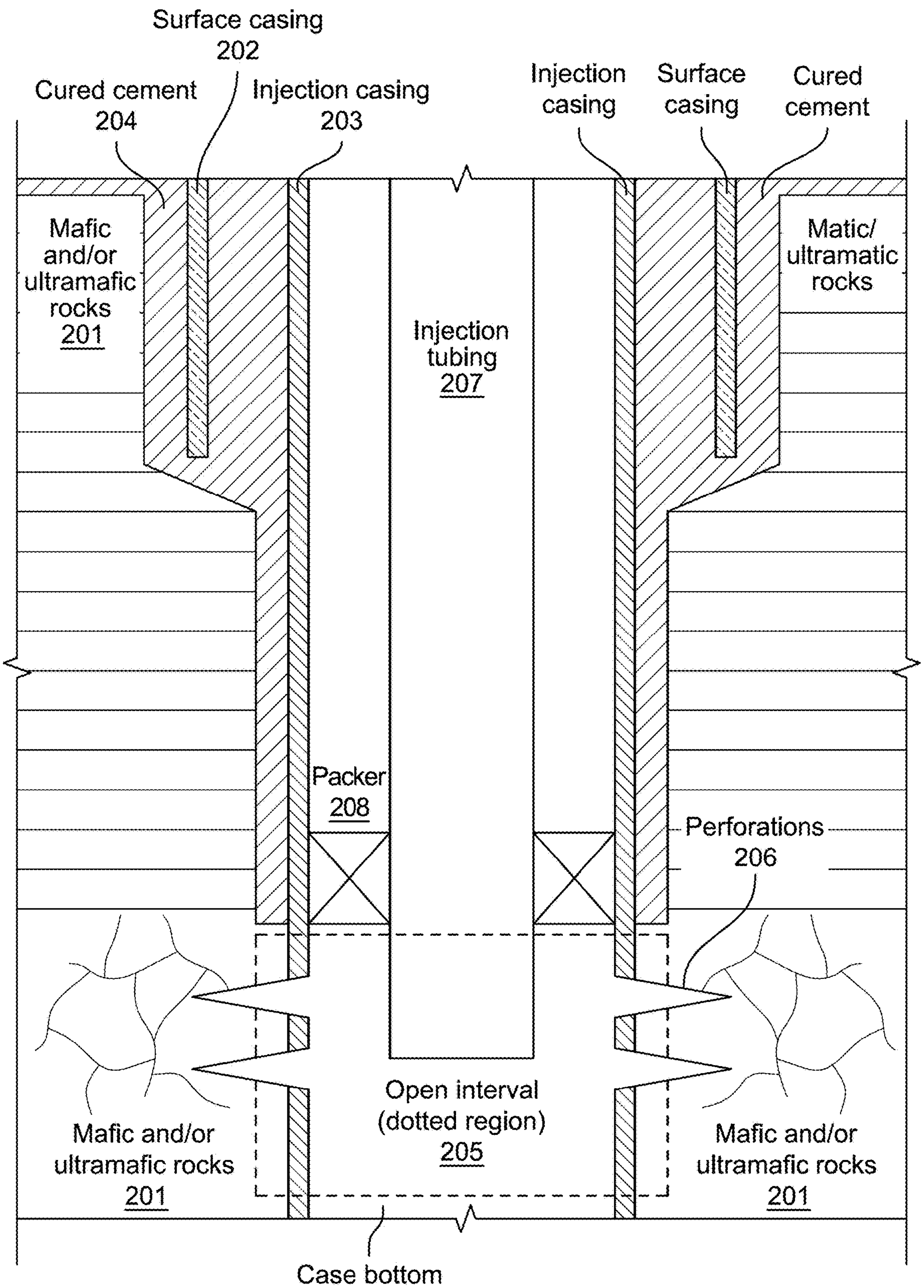
FIG. 2: is a diagram of an injection well according to some embodiments of the disclosed subject matter.

Referring to FIG. 2, some embodiments of the present disclosure include an injection well disposed in the borehole drilled in a mafic and/or ultramafic rock 201, same rock formation as 102 in FIG. 1. The injection well has two casings in the form of a steel pipe, a surface casing 202 at a diameter of 7 to 15 inches and a length of a first borehole drilling depth, and an injection casing 203 at a narrower diameter of 4.5 to 19 inches at a length of at least the first depth of the injection well. Each casing has an inner space within the steel pipe referred to as an interior of such casing, and an outer surface of the steel pipe referred to as an exterior of such casing. A cured cement 204 is filled circumferentially between the mafic and/or ultramafic rock 201 and the exterior of the surface casing 202, and between the interior of the surface casing 202 and the exterior of the injection casing 203. An open interval 205 is a bottom portion of the injection well from a first depth of the injection well to a depth lower than the first depth. The open interval 205 has a length of up to 100 meters, where the injection casing 203 may extend into. In the case where the injection casing 203 is extended into the open interval 205, a plurality of perforated holes 206 are present in the injection casing 203 and provide a pathway for fluid to enter the mafic and/or ultramafic rock, as depicted in FIG. 2. The fluidic communication may also happen when the open interval is free of the injection casing, which not shown in FIG. 2, where the $CO_2$ containing fluid enters the mafic and/or ultramafic rock directly. A packer 208 is placed inside the injection casing 203 at the first depth of the injection casing, and a pipe having a smaller diameter than the injection casing called an injection tubing 207 is placed inside the injection casing. The packer 208 seals the annulus between the inner surface of the injection casing and the outer surface of the injection tubing. When the packer 208 expands tightly against an inner surface of the injection casing 203 and against the injection tubing 207, it forms a seal isolating the open interval from the annulus above the packer 208.

In a preferred embodiment of the invention, the monitor system (103 in FIG. 1) includes a recovery well, where a return fluid is collected after $CO_2$ containing fluid passes through a targeted injection zone for $CO_2$ sequestration. Conventional practice involves a tracer present in the injection fluid to quantitatively measure an amount of $CO_2$ absorption, while in the present disclosure, the amount of $CO_2$ absorption may also be determined by measuring the change in $CO_2$/fluid ratio between an injection point at the injection well and a return point at the recovery well.

Figure 3:
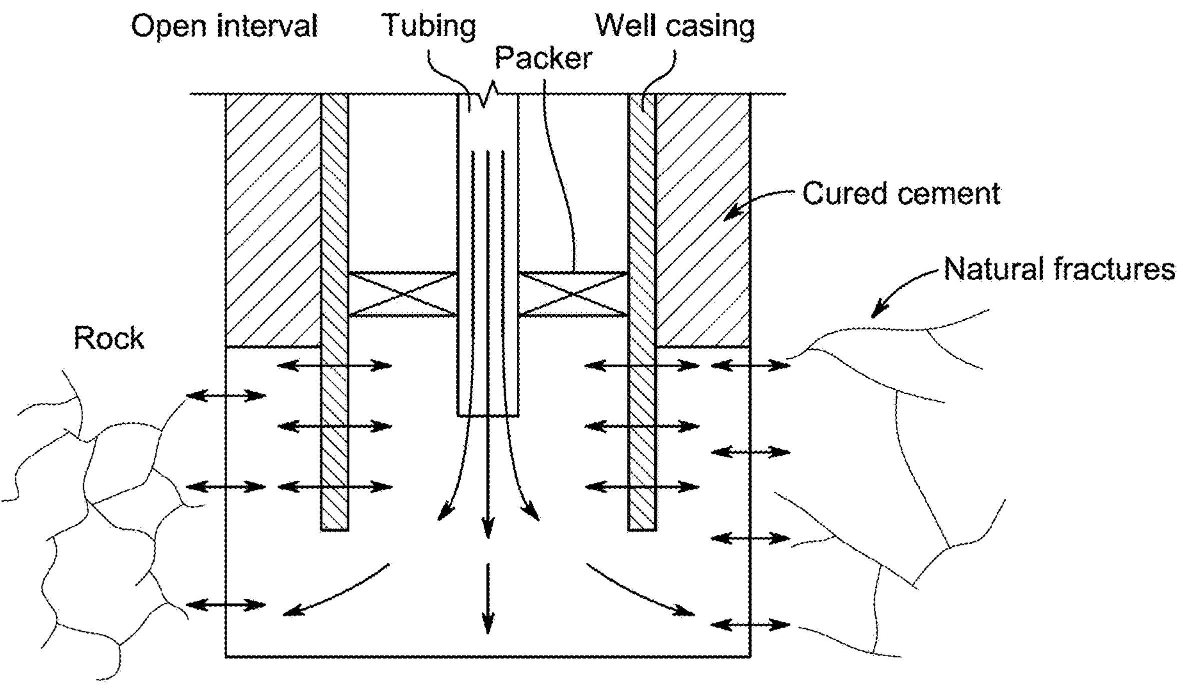
FIG. 3 is a diagram of an open interval at a first depth in an injection well according to some embodiments of the disclosed subject matter.

Referring now to FIG. 3, some embodiments of the disclosed invention include an open interval with a length of up to 100 meters at a first depth in the injection well. The open interval of the well casing contains perforated holes in the pipe that permits the fluidic communication between the well casing and the mafic or ultramafic rocks. While natural mafic and ultramafic rock has a density of 2.5 to 4.3 g/$cm^3$, it undergoes a natural serpentinization process to form a serpentinite rock with a density drop to between 2.1 and 2.9 g/$cm^3$. Such serpentinite rock exists underground at the same depth of the open interval. Given the density difference between a mafic and ultramafic rock and a serpentinite rock, the serpentinite rock contains existing fractures in the formation that are formed naturally. The fluidic communication that occurs at the open interval permits $CO_2$ containing liquid flow into the natural fractures in the rock, where $CO_2$ mineralization occurs to capture $CO_2$ in the underground formation by reaction with the rock.

EXAMPLES

Example 1

An injection well bored in a mafic and/or ultramafic rock used for carbon dioxide sequestration, comprising:

a surface casing with a diameter of 7 to 15 inches and a length of 100 to 500 meters;

an injection casing with a diameter of 4.5 to 10 inches and a length of 100 to 900 meters;

an open interval with a length of up to 100 meters at a first depth in the injection well, permitting fluid communication into the mafic and/or ultramafic rock, wherein the injection casing having a plurality of perforated holes is extended to a bottom of the open interval, or the open interval is free of the injection casing;

an injection tubing with a diameter of 2 to 4 inches disposed in the interior of the injection casing reaching the bottom of the open interval, and in fluid communication with the mafic and/or ultramafic rock;

a packer connected to the injection tubing at a second depth in the injection well, the packer forming a seal between an upper space in the injection casing and the open interval;

a cured cement between the mafic and/or ultramafic rock and an exterior of the surface casing, between an interior of the surface casing and an exterior of the injection casing, and between the exterior of the injection casing and the mafic and/or ultramafic rock, 70 wt. % of a class G cement;

25 wt. % of a fly ash Class F;

5 wt. % of a microsilica;

1.8 wt % of a dispersant Glo Ca Disp. 1000;

0.12 wt % of a fluid loss control agent Glo Ca FLC HT 1000;

0.4 wt % of an extender Glo Extender 3000;

10 wt. % of an epoxy resin blend of Resin A-81 containing modifier and Resin B-338, wherein wt % is based on the total weight of the class G cement, the fly ash, the microsilica, the additives and the epoxy resin blend

Example 2

An injection well bored in a mafic and/or ultramafic rock used for carbon dioxide sequestration, comprising:

a surface casing with a diameter of 7 to 15 inches and a length of 100 to 500 meters;

an injection casing with a diameter of 4.5 to 10 inches and a length of 100 to 900 meters;

an open interval with a length of up to 100 meters at a first depth in the injection well, permitting fluid communication into the mafic and/or ultramafic rock, wherein the injection casing having a plurality of perforated holes is extended to a bottom of the open interval, or the open interval is free of the injection casing;

an injection tubing with a diameter of 2 to 4 inches disposed in the interior of the injection casing reaching the bottom of the open interval, and in fluid communication with the mafic and/or ultramafic rock;

a packer connected to the injection tubing at a second depth in the injection well, the packer forming a seal between an upper space in the injection casing and the open interval;

a cured cement between the mafic and/or ultramafic rock and an exterior of the surface casing, between an interior of the surface casing and an exterior of the injection casing, and between the exterior of the injection casing and the mafic and/or ultramafic rock, 70 wt. % of a class G cement;

25 wt. % of a fly ash Class F;

5 wt. % of a microsilica;

1.2 wt % of a dispersant Glo Ca Disp. 1000;

0.10 wt % of a fluid loss control agent Glo Ca FLC HT 1000;

0.3 wt % of an extender Glo Extender 3000;

8 wt. % of an epoxy resin blend of Resin A-81, Resin B-338 and Resin C, wherein the weight of Resin B-338 is 50% of that of Resin A-81, and the weight of Resin C is 5% of that of Resin A-81, wherein wt % is based on the total weight of the class G cement, the fly ash, the microsilica, the additives and the epoxy resin blend.

Example 3

An injection well bored in a mafic and/or ultramafic rock used for carbon dioxide sequestration, comprising:

a surface casing with a diameter of 7 to 15 inches and a length of 100 to 500 meters;

an injection casing with a diameter of 4.5 to 10 inches and a length of 100 to 900 meters;

an open interval with a length of up to 100 meters at a first depth in the injection well, permitting fluid communication into the mafic and/or ultramafic rock, wherein the injection casing having a plurality of perforated holes is extended to a bottom of the open interval, or the open interval is free of the injection casing;

an injection tubing with a diameter of 2 to 4 inches disposed in the interior of the injection casing reaching the bottom of the open interval, and in fluid communication with the mafic and/or ultramafic rock;

a packer connected to the injection tubing at a second depth in the injection well, the packer forming a seal between an upper space in the injection casing and the open interval;

a cured cement between the mafic and/or ultramafic rock and an exterior of the surface casing, between an interior of the surface casing and an exterior of the injection casing, and between the exterior of the injection casing and the mafic and/or ultramafic rock, 70 wt. % of a class G cement;

25 wt. % of a fly ash Class F;

5 wt. % of a microsilica;

1.2 wt % of a dispersant Glo Ca Disp. 1000;

0.12 wt % of a fluid loss control agent Glo Ca FLC HT 1000;

0.4 wt % of an extender Glo Extender 3000;

16 wt. % of an epoxy resin blend of Resin A-81, Resin B-338 and Resin C, wherein the weight of Resin B-338 is 50% of that of Resin A-81, and the weight of Resin C is 10% of that of Resin A-81, wherein wt % is based on the total weight of the class G cement, the fly ash, the microsilica, the additives and the epoxy resin blend.

Example 4

An injection well bored in a mafic and/or ultramafic rock used for carbon dioxide sequestration, comprising:

a surface casing with a diameter of 7 to 15 inches and a length of 100 to 500 meters;

an injection casing with a diameter of 4.5 to 10 inches and a length of 100 to 900 meters;

an open interval with a length of up to 100 meters at a first depth in the injection well, permitting fluid communication into the mafic and/or ultramafic rock, wherein the injection casing having a plurality of perforated holes is extended to a bottom of the open interval, or the open interval is free of the injection casing;

an injection tubing with a diameter of 2 to 4 inches disposed in the interior of the injection casing reaching the bottom of the open interval, and in fluid communication with the mafic and/or ultramafic rock;

a packer connected to the injection tubing at a second depth in the injection well, the packer forming a seal between an upper space in the injection casing and the open interval;

a cured cement between the mafic and/or ultramafic rock and an exterior of the surface casing, between an interior of the surface casing and an exterior of the injection casing, and between the exterior of the injection casing and the mafic and/or ultramafic rock, 72 wt. % of a class G cement;

25 wt. % of a fly ash Class F;

3 wt. % of a microsilica;

0.8 wt % of a dispersant Glo Ca Disp. 1000;

0.8 wt % of a dispersant optima 1105;

0.12 wt % of a fluid loss control agent Glo Ca FLC HT 1000;

0.3 wt % of an extender Glo Extender 3000;

14 wt. % of an epoxy resin blend of Resin A-81, Resin B-338 and Resin C, wherein the weight of Resin B-338 is 50% of that of Resin A-81, and the weight of Resin C is 15% of that of Resin A-81, wherein wt % is based on the total weight of the class G cement, the fly ash, the microsilica, the additives and the epoxy resin blend.

The invention claimed is:

1. A method of cementing a $CO_2$ injection well bored in an underground geological formation formed of mafic and/or ultramafic rock, comprising:

injecting a cementitious slurry mixture into an annulus between a well casing and an injection well wall, wherein the cementitious slurry mixture comprises:

60-80 wt. % of a class G cement;

10-35 wt. % of a fly ash;

1-5 wt. % of a microsilica;

1-5 wt. % of a plurality of additives;

10-15 wt. % of an epoxy resin blend, wherein wt % is based on the total weight of the class G cement, the fly ash, the microsilica, the additives and the epoxy resin blend, curing the cementitious slurry mixture to form a cured cement to bond the injection well casing to the injection well wall, after the curing, injecting a $CO_2$-containing fluid into the $CO_2$ injection well below the first depth, and reacting $CO_2$ in the $CO_2$-containing fluid with the mafic and/or ultramafic rock in the underground geological formation to sequester the $CO_2$ in the underground geological formation, wherein the epoxy resin blend in the cementitious slurry mixture comprises a bisphenol A-based diglycidyl ether, an amine, and 1,4-butanediol diglycidyl ether, wherein the curing is performed at a temperature of 50 to 70° C. for a period of 4-10 hours, and wherein the cured cement has a bonding strength of 350 to 400 bar after 7 days of curing according to ASTM C109 standard and a durability with a strength retention of at least 97% after up to 7 days exposure to $CO_2$ containing fluid.

2. The method of claim 1, wherein the class G cement contains 18-22 wt % of $SiO_2$, 2-4 wt % of $Al_2O_3$, 3-5 wt % of $Fe_2O_3$, 58-64 wt % of CaO, 1-3 wt % of MgO, 0.1-0.5 wt % of $Na_2O$, 4-6 wt % of $SO_3$, and 0.2-0.4 wt % of MnO, with wt % based on the total weight of the class G cement, and wherein the fly ash contains 45-50 wt % of $SiO_2$, 20-23 wt % of $Al_2O_3$, 10-13 wt % of $Fe_2O_3$, 9-10 wt % of CaO, 4-5 wt % of MgO, 1-3 wt % of $Na_2O$, 0.3-0.5 wt % of $SO_3$ and 0.1-0.3 wt % of MnO, with wt % based on the total weight of the fly ash, and wherein the microsilica contains 90-95 wt % of $SiO_2$, 0.3-0.4 wt % of $Al_2O_3$, 0.005-0.009 wt % of $Fe_2O_3$, 1.5-1.8 wt % of CaO, 0.2-0.3 wt % of MgO, 0.05-0.10 wt % of $Na_2O$, 0.4-0.5 wt % of $SO_3$, and 0.1-0.2 wt % of MnO, with wt % based on the total weight of the microsilica, and wherein the class G cement, the fly ash and the microsilica have a Loss On Ignition (LOI) value of 2-3 wt %, 0.3-0.4 wt % and 3-4 wt %, where wt % is based on the total weight of the class G cement, the fly ash and the microsilica, respectively.

3. The method of claim 1, wherein the additives in the cementitious slurry mixture comprise:

a cement retarder in an amount of 0.1% to 0.5 wt %;

a dispersant to reduce friction in an amount of 0.1% to 2 wt %;

a fluid loss control agent in an amount of 0.1% to 2 wt %;

a degassing agent in an amount of 0.1% to 2 wt %;

a defoamer in an amount of 0.1% to 2 wt %;

an extender in an amount of 0.05% to 1 wt %, wherein the wt % is based on the total weight of the class G cement, the fly ash, the microsilica, the additives and the epoxy resin blend.

4. The method of claim 1, wherein the epoxy resin blend in the cementitious slurry mixture comprises:

a bisphenol A-based diglycidyl ether;

a mixture of an aromatic alcohol and a plurality of amines, wherein the aromatic alcohol is benzyl alcohol, and wherein the amines are selected from the group consisting of a linear alkyl diamine, a cyclic alkyl diamine, a piperazine, a piperazine derivative and an epoxy-based diamine, and 1,4-butanediol diglycidyl ether.

5. The method of claim 4, further comprising making the cementitious slurry mixture by:

forming a cement slurry by first mixing the additives with water, followed by mixing the class G cement, the fly ash and the microsilica;

forming an epoxy resin blend by mixing in an order of the bisphenol A-based diglycidyl ether; the mixture of the aromatic alcohol and the plurality of amines, and the 1,4-butanediol diglycidyl ether;

mixing the cement slurry with the epoxy resin blend for up to 10 minutes to form the cementitious slurry mixture.

6. The method of claim 1, wherein the cementitious slurry mixture is injected from a first depth up to a second depth in the $CO_2$ injection well by pumping under a first pressure, and wherein after the injection, a second pressure of about 3000 psi is applied to the cementitious slurry mixture in place.

7. The method of claim 1, wherein after the injecting, a bottom portion of the $CO_2$ injection well is uncemented from a first depth to a depth lower than the first depth.

8. The method of claim 1, wherein the cured cement has a higher bonding strength, compressive strength and corrosion resistance than a cured class G cement alone.

9. The method of claim 1, wherein the $CO_2$-containing fluid is acidic and comprises water.

10. The method of claim 9, further comprising:

wherein the mafic and/or ultramafic rock contains olivine and pyroxene, and has a density of 2.5 to 3.4 g/$cm^3$.

* * * * *